United States Patent

Serini et al.

[11] Patent Number: 5,032,661
[45] Date of Patent: Jul. 16, 1991

[54] THERMOPLASTIC POLYESTER-CARBONATE/POLYSILOXANE BLOCK COPOLYMERS

[75] Inventors: Volker Serini; Werner Nouvertné, both of Krefeld; Ulrich Grigo, Kempen, all of Fed. Rep. of Germany; Winfried Paul, Pittsburgh, Pa.; Dieter Freitag, Krefeld, Fed. Rep. of Germany

[73] Assignee: Bayer Aktiengesellschaft, Leverkusen-Bayerwerk, Fed. Rep. of Germany

[21] Appl. No.: 428,837

[22] Filed: Oct. 30, 1989

[30] Foreign Application Priority Data

Nov. 10, 1988 [DE] Fed. Rep. of Germany ....... 3838106

[51] Int. Cl.$^5$ ............................................. C08G 77/06
[52] U.S. Cl. ..................................... 528/21; 528/23; 528/25; 528/26; 528/29; 525/464
[58] Field of Search .................... 525/464; 528/26, 29, 528/25, 21, 23

[56] References Cited

U.S. PATENT DOCUMENTS 3,935,154  1/1976  Cawley .............................. 525/464
4,699,967  10/1987  Eichenauer et al. .................. 525/25

Primary Examiner—Melvyn I. Marquis
Attorney, Agent, or Firm—Connolly & Hutz

[57] ABSTRACT

Polyester-carbonate/polysiloxane block copolymers containing the following recurring structural units:

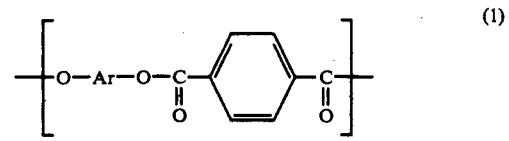

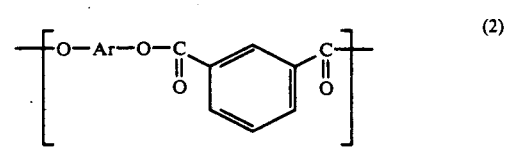

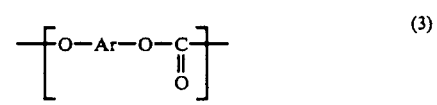

and

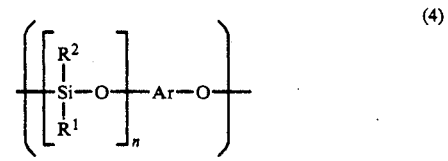

wherein the structural units (1) comprise at least 75 wt.% of the sum of the structural units (1) and (2), exhibit better low temperature tough fracture properties than the known polyester-carbonate/polysiloxane block copolymers containing comparable recurring structural units on comparison of polyester-carbonate/polysiloxane block copolymers of the same heat resistance.

4 Claims, No Drawings

THERMOPLASTIC POLYESTER-CARBONATE/POLYSILOXANE BLOCK COPOLYMERS

The invention relates to new thermoplastic polyester-carbonate/polysiloxane block copolymers having improved low temperature tough fracture properties and the use thereof for the production of shaped articles.

Siloxane/polyester-carbonate block copolymers which have a good industrial heat resistance and a better thermoplastic processability than non-modified aromatic polyester-carbonates are known from DE-OS 33 44 911.

Polyester-carbonate/polysiloxane block copolymers containing from 45 to 60 wt. % polysiloxane blocks are described in DE-OS 26 40 241. However, these polymers do not have a satisfactory industrial heat resistance.

The present invention relates to polyester-carbonate/polysiloxane block copolymers containing the following recurring structural units.

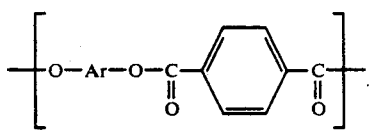 (1)

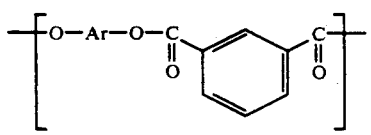 (2)

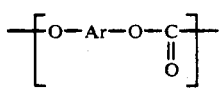 (3)

and

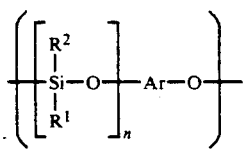 (4)

wherein $R^1$ and $R^2$, which may be same or different, represent optionally halogen substituted $C_1$-$C_{20}$ alkyl, $C_2$-$C_6$ alkenyl, $C_6$-$C_{14}$ aryl, $C_7$-$C_{15}$ aralkyl or $C_7$-$C_{15}$ alkaryl, and wherein each

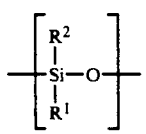

unit may be substituted by different radicals $R^1$ and $R^2$;
Ar represents a mono- or poly-nuclear aromatic radical having from 6 to 30 carbon atoms, and
n represents an integer of from 5 to 200, preferably from 10 to 100, more preferably from 20 to 80 and most preferably from 30 to 70, and
wherein the structural units (1) and (2) comprise from 5 to 98 wt. %, preferably from 10 to 95 wt. %, more preferably from 15 to 85 wt. % and most preferably from 20 to 65 wt. % of the sum of the structural units (1), (2) and (3), and the structural units (4) comprise from 0.1 to 40 wt. %, preferably from 0.3 to 30 wt. %, more preferably from 0.6 to 15 wt. % and most preferably from 1 to 8 wt. %, of the sum of the structural units (1), (2), (3) and (4), which are characterised in that the structural units (1) comprise from 75 to 100 wt. %, preferably from 80 to 100 wt. %, more preferably from 90 to 100 wt. % and most preferably 100 wt. %, of the sum of the structural units (1) and (2).

Suitable radicals Ar in the above-mentioned recurring structural units are those which are based on aromatic dihydroxy compounds, such as hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) ketones, bis-(hydroxyphenyl) sulphones, $\alpha,\alpha'$-bis(hydroxyphenyl)-isopropylbenzenes, pentamethyl(hydroxyphenyl)- indanols and corresponding nuclear-substituted compounds. These and other suitable aromatic dihydroxy compounds are described, e.g. in the monograph by H. Schnell, Chemistry and Physics of Polycarbonates, Polymer Review 9, Interscience Publishers, New York 1964, in the publication by V. Serini, D. Freitag and H. Vernaleken, Polycarbonate aus o,o,,o',o'-tetramethyl-substituierten Bisphenolen (Polycarbonates from o,o,o',o'-tetramethyl-substituted bisphenols), Angewandte Makromolekulare Chemie 55 (1976) 175 to 189; and in U.S. Pat. No. 3,028,365; 2,999,835; 3,148,172; 3,271,368; 2,991,273; 3,271,367; 3,780,078; 3,014,891 and 2,999,846, in DT-OS 1,570,703; 2,063,050; 2,063,052; 2,211,957; 2,402,175; 2,402,176 and 2,402,177, and FR-PS 1,561,518.

The following aromatic dihydroxy compounds are mentioned as being preferred: hydroquinone, bis-(4-hydroxyphenyl), 2,2-bis-(4-hydroxyphenyl)-propane, bis-(4-hydroxyphenyl) sulphide, bis-(4-hydroxyphenyl) ether, bis-(4-hydroxphenyl) ketone, bis-(4-hydroxyphenyl) sulphone, bis-(4-hydroxyphenyl)-methane, 1,1-bis-(4-hydroxyphenyl)-cyclohexane, $\alpha,\alpha'$-bis(4-hydroxyphenyl)-p-diisopropylbenzene, 1,1-bis-(4-hydroxyphenyl)-1-phenylethane, 2,2-bis-(3-methyl-4-hydroxyphenyl)-propane, 2,2-bis-(3,5-dichloro-4-hydroxyphenyl)-propane, 2,2-bis-(3,5-dibromo-4-hydroxyphenyl)-propane, 2,2-bis-(3,5-dimethyl-4-hydroxyphenyl)-propane, bis-(3,5-dimethyl-4-hydroxyphenyl)methane, 2,2-bis-(3,5-dimethyl-4-hydroxyphenyl)-butane and bis(3,5-dimethyl-4-hydroxyphenyl).

The following are mentioned as being particularly preferred: bis(4-hydroxyphenyl), 2,2-bis-(4-hydroxyphenyl)-propane and 2,2-bis-(3,5-dimethyl-4-hydroxyphenyl)-propane, 2,2-bis-(4-hydroxyphenyl)-propane being especially preferred.

Radicals $R^1$ and $R^2$ which may be mentioned as being preferred are $C_1$-$C_6$ alkyl, $C_2$-$C_8$ alkenyl, $C_6$-$C_{10}$ aryl, $C_7$-$C_{12}$ aralkyl and $C_7$-$C_{12}$ alkaryl. The radicals mentioned may be completely or partly substituted by halogen, such as fluorine, chlorine or bromine, preferably fluorine or chlorine and more preferably fluorine. The following radicals $R^1$ and $R^2$ are mentioned as being preferred: methyl, ethyl, propyl, n-butyl, tert.-butyl, vinyl, phenyl, naphthyl, chloromethyl, 3,3,3-trifluoropropyl, perfluorobutyl and perfluorooctyl, more preferably methyl and phenyl and most preferably methyl.

The polyester-carbonate/polysiloxane block copolymers according to the present invention may be prepared by processes such as are known from the literature for polyester-carbonate preparation, thus, e.g., by melt transesterification processes, by processes in homogeneous solution and interfacial polycondensation processes. Interfacial polycondensation processes are preferably used (see EP 0 036 080 and V. V. Korshak and S. V. Vinograda, Polyesters, Pergamon Press, 1965, p. 448).

Aromatic dihydroxy compounds, terephthaloyl dichloride and/or isophthaloyl dichloride, phosgene and polydiorganosiloxanes having hydroxyarloxy end groups are preferably employed as starting components for the preparation of the polyester-carbonate/polysiloxane block copolymers according to the present invention by the two phase boundary process. It is possible to employ polydiorganosiloxanes having different substituents as a mixture. Such poly-diorganosiloxanes having hydroxyarloxy end groups are described, e.g. in DE-OS 33 34 782.

It is also possible to use terephthalic acid and isophthalic acid in the two phase boundary process, in which case dicarboxylic acid chlorides or dichlorides are intermediately formed with the aid of phosgene. The use of polydiorganosiloxanes which contain

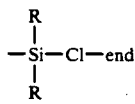

groups is also possible. Bischlorocarbonic acid esters of the aromatic dihydroxy compounds may likewise be used.

Instead of terephthalic acid and/or isophthalic acid, the polyester-carbonate/polysiloxane copolymers according to the present invention may contain up to 30 mol % of co-condensed units of other dicarboxylic acids, in particular aromatic dicarboxylic acids, such as t-butylisophthalic acid, 3,3'-diphenyl dicarboxylic acid, 4,4'-diphenyl dicarboxylic acid, 4,4'-benzophenone dicarboxylic acid, 3,4'-benzophenone dicarboxylic acid, 4,4'-diphenyl ether dicarboxylic acid, 4,4'-diphenyl sulphone dicarboxylic acid, 2,2-bis-(4-carboxyphenyl)-propane, trimethyl-3-phenylindane-4',5-dicarboxylic acid or naphthalene dicarboxylic acid, based on the sum of the dicarboxylic acids. They may likewise contain up to 40 mol % of co-condensed units of hydroxycarboxylic acids, in particular aromatic hydroxycarboxylic acids, such as p-hydroxybenzoic acid or hydroxynaphthoic acids, based on the sum of the aromatic dicarboxylic acids.

The polyester-carbonate/polysiloxane block copolymers according to the present invention may be mixed in the customary manner without at least one polymer selected from aromatic polyester-carbonates, aromatic polyesters and aromatic polycarbonates. The amount of the above-mentioned polymers admixed with the block copolymers according to the present invention is advantageously such that the property profile of the present thermoplastic polyester-carbonate/polysiloxane block copolymers is not substantially changed. The amount of polymers admixed is usually from 97 to 1 wt. %, more preferably from 90 to 1 wt. %, based on the total mixture. The amount of the polymers mentioned is preferably such that the sum of the units (1) to (4) falls below the limits according to the present invention for the polyester-carbonate/polysiloxane block copolymers.

The polycondensation is generally carried out in the interfacial polycondensation process in a two-phase system of aqueous alkali solution and water-immiscible organic solvent. The polycondensation is in general carried out with the aid of a catalyst. If appropriate, the polycondensation is carried out in the presence of chain-regulators, branching agents and antioxidants.

Examples of water-immiscible organic solvents which may be used are chlorinated hydrocarbons, such as chloroform, dichloroethane, tri- and tetra-chloroethylene, tetrachloroethane, methylene chloride, chlorobenzene and dichlorobenze, and also non-chlorinated hydrocarbons, such as toluene and xylene. Chlorobenzene or methylene chloride or mixtures of the two are preferably used.

Compounds such as are known from production of polycarbonates, polyesters and polyester-carbonates, thus, e.g. secondary amines, phenols and acid chlorides, are employed as chain-regulators. Phenols, such as phenol, alkyl-phenols, preferably having $C_1$-$C_{12}$ alkyl groups, such as p-t-butylphenol, m- and p-3,5-dimethylheptyl-phenol and m- and p-1,1,3,3-tetramethylbutyl-phenol, hydroxydiphenyl and p-cumylphenol, are preferably used. p-1,1,3,3-tetramethylbutylphenol (p-isooctylphenol) is particularly preferably employed.

Compounds which are at least trifunctional may be employed as branching agents. Such branching agents are known (see EP 00 36 080, DE-OS 3,506,472 and 2,615,038) and are in general employed in amounts of from about 0.01 to 3 mol %, based on the aromatic dihydroxy compounds employed.

Catalysts which may be employed are, in particular, tertiary amines and phase transfer catalysts, such as quaternary ammonium and phosphonium compounds and crown ethers. Examples of preferred catalysts are N-ethylpiperidine, tetrabutylammonium bromide and/or triphenylbenzylphosphonium bromide.

The polyester-carbonate/polysiloxane block copolymers according to the present invention in general have relative viscosities ($\eta_{rel}$) of from about 1.10 to 5.0, preferably from 1.15 to 3.0, more preferably from 1.18 to 1.60, most preferably from 1.20 to 1.50 and in particular from 1.24 to 1.40, measured in methylene chloride or in phenol/o-dichlorobenzene (1/1 parts, by wt.) at c=5 g/l and 25° C.

The polyester-carbonate/polysiloxane block copolymers according to the present invention may be processed to shaped articles of high toughness, in particular of high toughness at low temperatures. The present polyester-carbonate/polysiloxane block copolymers are therefore particularly suitable for components which should not break or undergo brittle fracture at low temperatures (e.g. bumpers, car interior components).

If appropriate, dyestuffs, pigments, stabilizers, flameproofing agents, fillers and reinforcing agents, such as glass fibres or carbon fibres, or other auxiliaries may be mixed into the polyester-carbonate/polysiloxane block copolymers according to the present invention in the conventional amounts.

Compared with the block copolymers described in DE-OS 33 44 911, the polyester-carbonate/polysiloxane block copolymers according to the present invention have better low temperature tough fracture properties on comparison with polyester-carbonate/polysiloxane block copolymers with the same heat resistance. In comparison with the polyester-carbonate/polysiloxane block copolymers of DE-OS 26 40 241, the block copolymers according to the present invention have a higher rigidity.

EXAMPLE 1

Polyester-carbonate/polysiloxane block copolymer; containing 5 wt. % polysiloxine blocks, polyester content 40 wt. % of the polyester-carbonate content, terephthalate content 100 wt. % of the polyester content (apesi 40 t 100/si 5)

840 g NaOH (21 mol) and 2,283 g bisphenol A (10 mol) were dissolved in 85 kg distilled water. 55 kg methylene chloride containing 103 g p-isooctylphenol (0.5 mol) and 151 g of a polydimethylsiloxane having an average degree of polycondensation $\overline{P}_n$ of 60 and bisphenol A end groups (0.031 mol) in dissolved form were added. 675 g terephthaloyl dichloride (3.2 mol), dissolved in 5 kg methylene chloride, and 495 g phosgene (5 mol) were added simultaneously and uniformly at a temperature of 25° C. in the course of 30 minutes, while stirring. Stirring was then continued at 25° C. for 30 minutes. 840 g NaOH (21 mol), dissolved in 5 kg distilled water, were then added and a further 495 g phosgene (5 mol) were added uniformly at 25° C. in the course of 30 minutes. 45 g N-ethylpiperidine (0.4 mol) were then added and stirring was continued at 25° C. for a further 30 minutes.

For working-up of the polyester-carbonate/polysiloxane block copolymer formed, the organic phase was separated off from the two phase mixture and washed with dilute aqueous NaOH, dilute aqueous H3P04 and distilled water until the wash water was free from electrolytes. The polyester-carbonate/polysiloxane block copolymer was then subjected, after addition of chlorobenzene to the methylene chloride solution, to preliminary evaporation to a concentrated solution in a reactor, and the polyester-carbonate/polysiloxane block copolymer was then isolated as granules from the solution by devolatilization extrusion. The relative viscosity of the granules was $\eta_{rel}=1.261$, measured in CH$_2$Cl$_2$ at 25° C., c=5 g/l. These granules were then processed to test specimens by extrusion injection moulding. The test results obtained on these test specimens are contained in the Table below.

EXAMPLE 2
(COMPARISON)

Polyester-carbonate/polysiloxane block copolymer: containing 5 wt. % polysiloxane blocks, polyester content 53 wt. % of the polyester-carbonate content, terephthalate content 50 wt. % of the polyester content of terephthalate and isophthalate (APESI 53 T 50/Si 5).

840 g NaOH (21 mol) and 2,283 g bisphenol A (10 mol) were dissolved in 85 kg distilled water. 55 kg methylene chloride containing 103 g p-isoctylphenol (0.5 mol) and 158 g of a polydimethylsiloxane having an average degree of polycondensation $\overline{P}_n=60$ and having bisphenol A end groups (0.032 mol) in dissolved form were added. 950 g of a 1/1 terephthaloyl dichloride/isophthaloyl dichloride mixture dissolved in 5 kg methylene chloride, and 396 g phosgene (4 mol) were added simultaneously and uniformly at a temperature of 25° C. in the course of 30 minutes, while stirring. Stirring was then continued at 25° C. for 30 minutes. 880 g NaOH (22 mol), dissolved in 5 kg distilled water, were then added and a further 495 g phosgene (5 mol) were uniformly added at 25° C. in the course of 30 minutes. 45 g N-ethylpiperidine (0.4 mol) were then added and stirring was continued at 25° C. for a further 30 minutes.

For working-up of the polyester-carbonate/polysiloxane block copolymer formed, the organic phase was separated off from the two phase mixture and washed with dilute aqueous NaOH, dilute aqueous H$_3$PO$_4$ and distilled water until the wash water was free from electrolytes. The polyester-carbonate/ polysiloxane block copolymer was then subjected, after addition of chlorobenzene to the methylene chloride solution, to preliminary evaporation to a concentrated solution in a kettle, and the polyester-carbonate/polysiloxane block copolymer was then isolated as granules from the solution by devolatilization extrusion. The relative viscosity of the granules was $\eta_{rel}=1.258$, measured in CH$_2$Cl$_2$ at 25° C., c=5 g/l. These granules were then processed to test specimens by extrusion injection moulding.

The test results obtained on these test specimens are contained in the Table below.

EXAMPLES 3 TO 6

Polyester-carbonate/polysiloxane block copolymers of various compositions:

The following polyester-carbonate/polysiloxane block copolymers were prepared in a manner corresponding to the polyester-carbonate/polysiloxane block copolymers of Examples 1 and 2 using correspondingly modified reactant ratios, with an otherwise identical preparation procedure and the same reactants, and the products were processed to test specimens (poly-siloxane block of the same content):

| Ex. no. | Abbreviated name of the polymer | Polyester content of the polyester-carbonate content (wt. %) | Terephthalate content of the polyester content of terephthalate and isophthalate (wt. %) | $\eta_{rel}$ * of the granules |
| --- | --- | --- | --- | --- |
| 3 | APSEI 55 T 100/Si 5 | 55 | 100 | 1.301 |
| 4 | APSEI 74 T 50/Si 5 (comparison) | 74 | 50 | 1.303 |
| 5 | APSEI 22 T 100/Si 5 | 22 | 100 | 1.262 |
| 6 | APSEI 30 T 50/Si 5 (comparison) | 30 | 50 | 1.265 |

* = $\eta_{rel}$ in CH$_2$Cl$_2$ at 25° C., c = 5 g/l

Table Critical temperature (tough fracture/brittle fracture transition) of polyester-carbonate/polysiloxane block copolycarbonates Tcrit. = critical temperature: temperature at which the tough fracture of the polymer (fracture pattern with extended ranges, conchoidal) changes into brittle fracture (fracture pattern smooth); determined on notched test specimens (80×10×3.2 mm) which were subjected to impact in order to determine the Izod notched impact strength and broke during this test (ISO 180 Method 4 A, Izod flexural impact test)

| Ex. no. | Polymer | $T_{crit}$(°C.) | Heat resistance according to Vicat B (°C.) |
|---|---|---|---|
| 1 | APESI 40 T 100/Si 5 | less than −60 | 169 |
| 2 | APESI 53 T 50/Si 5 | −35 | 169 |
| 3 | APESI 55 T 100/Si 5 | −50 | 178 |
| 4 | APESI 74 T 50/Si 5 | more than +25 | 178 |
| 5 | APESI 22 T 100/Si 5 | less than −65 | 158 |
| 6 | APESI 30 T 50/Si 5 (comparison) | −40 | 158 |

In the above Examples, it was ensured that the heat resistance of the polyester-carbonate/polysiloxane block copolymers according to Vicat B had the same value within a comparison group. This is important for the art and was achieved by a correspondingly different polyester content, as may be seen from the Table.

We claim:

1. Polyester-carbonate/polysiloxane block copolymers containing the following recurring structural units:

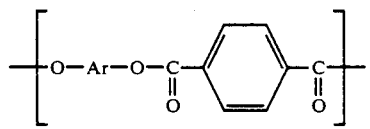 (1)

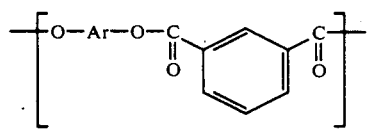 (2)

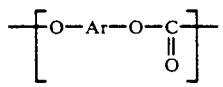 (3)

and

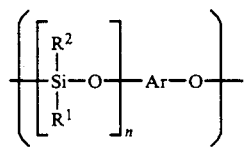 (4)

wherein $R^1$ and $R^2$, which may be the same or different, represent optionally halogen substituted $C_1$–$C_{20}$ alkyl, $C_2$–$C_6$ alkenyl, $C_6$–$C_{14}$ aryl, $C_7$–$C_{15}$ aralkyl or $C_7$–$C_{15}$ alkaryl, and wherein each

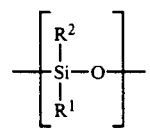

unit may be substituted by different radicals $R^1$ and $R^2$,

Ar represents a mono- or poly-nuclear aromatic radical having from 6 to 30 carbon atoms; and n represents an integer of from 5 to 200, and wherein the structural units (1) and (2) comprise from 5 to 98 wt. % of the sum of the structural units (1), (2) and (3), and the structural units (4) comprise from 0.1 to 40 wt. % of the sum of the structural units (1), (2), (3) and (4), characterized in that the structural units (1) comprise at least 75 wt. % of the sum of the structural units (1) and (2).

2. Polyester-carbonate/polysiloxane block copolymers according to claim 1, characterised in that the structural units (1) comprise from 90 to 100 wt. % of the sum of the structural units (1) and (2).

3. Polyester-carbonate/polysiloxane block copolymers according to claim 1, characterized in that the structural units (1) comprise 100 wt. % of the sum of the structural units (1) and (2).

4. A shaped article produced from the polyester-carbonate/polysiloxane block copolymers as claimed in claim 1.

* * * * *